Oct. 24, 1939.　　M. KLEIN ET AL　　2,177,218
MAGNETIC COMPASS
Filed May 4, 1937
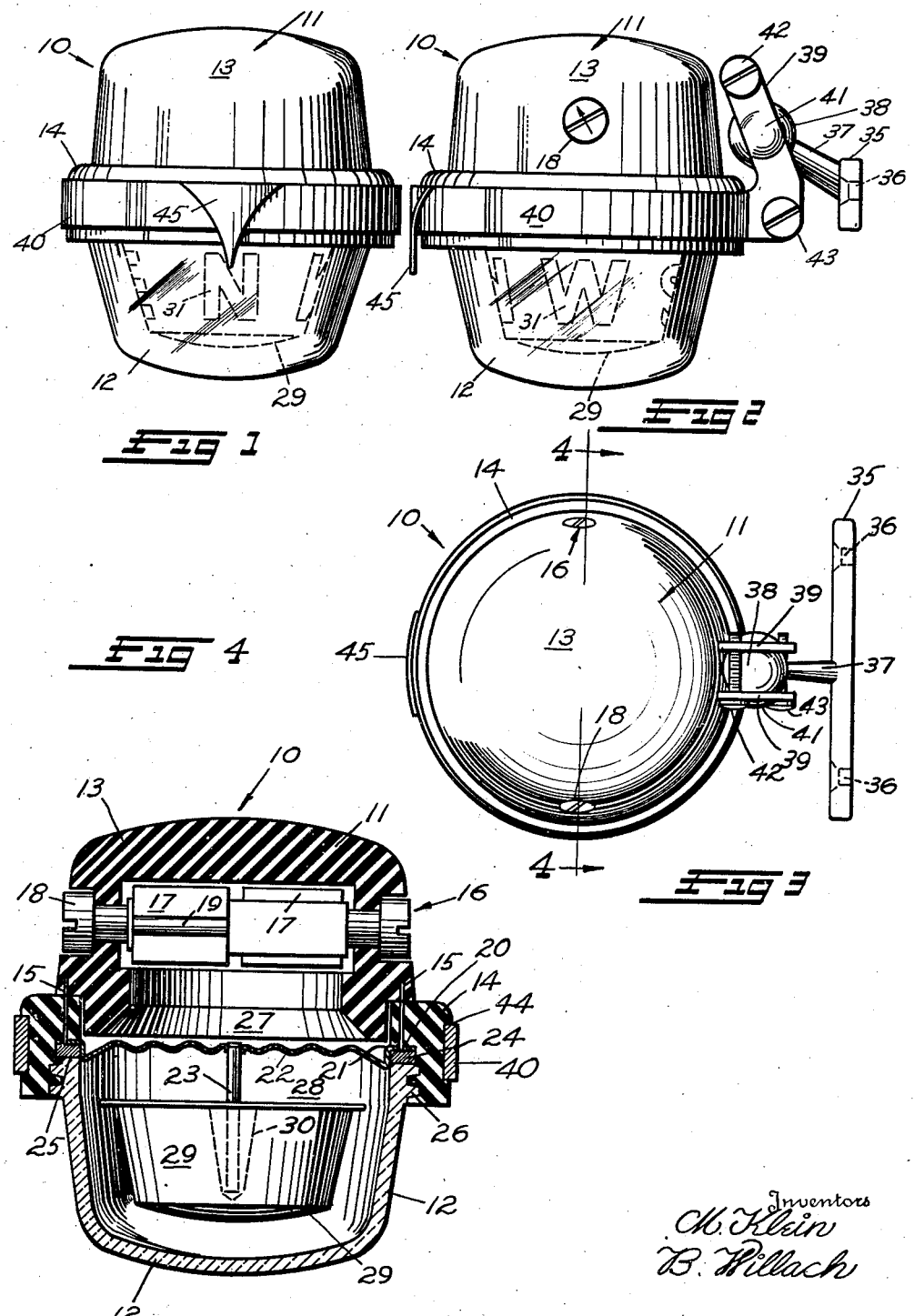
Inventors
M. Klein
B. Willach
By Strauch & Hoffman
Attorneys Patented Oct. 24, 1939

2,177,218

UNITED STATES PATENT OFFICE 2,177,218

MAGNETIC COMPASS

Maximilian Klein and Bernhard Willach, Sellersville, Pa., assignors to United States Gauge Company, Sellersville, Pa., a corporation of Pennsylvania Application May 4, 1937, Serial No. 140,717

11 Claims. (Cl. 33—222)

The present invention relates to improvements in magnetic compasses, and, more particularly, to improved mounting and compensating means for magnetic compasses designed for use on automobiles, small boats or other vehicles.

Since many vehicle operators have no knowledge of the manner in which magnetic compasses operate, or how to mount and compensate a compass to overcome local magnetic conditions, it is desirable to make a compass of the character referred to that is easy to connect to a vehicle, and that is simple for a novice to adjust for obtaining an accurate reading.

It is, therefore, an important object of this invention to provide an extremely simple universal connection between a compass and its supporting bracket to permit a compass to be mounted in a plane parallel to the line of travel of the vehicle and level it after it is installed on the vehicle.

Another important object of the present invention resides in providing a magnetic compass with simple readily accessible compensating means capable of being operated by an inexperienced person.

A further object of the present invention is to provide a magnetic compass adapted to be rotatably adjustably supported with respect to a lubber's mark so as to permit compensation of the compass to obtain accurate readings on a selected heading of the compass.

Further objects will appear from the following description when read in connection with the appended claims and the attached drawing wherein:

Figure 1 is a front elevational view of a magnetic compass embodying the novel features of the present invention;

Figure 2 is a side elevational view of the compass illustrated in Figure 1;

Figure 3 is a top plan view of the compass of Figures 1 and 2; and

Figure 4 is a vertical sectional view taken on line 4—4 of Figure 3.

With reference to the drawing wherein like reference numerals are used to indicate the same parts throughout the several views, the numeral 10 indicates a compass embodying the improvements constituting the present invention.

Compass 10 comprises a casing 11 including a bowl portion 12 of glass or like transparent material, a hollow housing section 13 of composition material, such as Bakelite, and an intermediate ring 14 of a similar material adapted to interconnect bowl 12 and housing 13. The connection between housing 13 and ring 14 may take any desired form such as a press fit, threaded connection, or rivets 15, as shown in the drawing.

A suitable magnetic compensating mechanism 16, comprising compensating magnets 17 of any suitable construction carried by a headed bolt 18, threaded into a sleeve 19, is disposed in hollow housing 13. The operation of compensating mechanism 16 is clearly pointed out in our co-pending application Serial Number 38,814 filed on August 31, 1935. Since this magnetic compensating mechanism operates in known manner, a more detailed description thereof will not be attempted in this application.

Ring 14 is provided with an internal annular shoulder 20 against which annular rim 21 of a diaphragm 22, carrying a centrally disposed depending needle shaped pivot 23, abuts. Rivets 15 preferably extend through rim 21 and thus secure diaphragm 22 to housing 13. A cork or similar gasket 24 is disposed on the opposite face of rim 21 and is adapted to engage the edge 25 of bowl 12, when bowl 12 is threadedly secured to rim 14 by screw threads 26. As a consequence, diaphragm 22 separates chamber 27 of housing 13 and chamber 28 formed by bowl 12. The gasket 24 forms a liquid tight seal for chamber 28.

Bowl 12 is filled with a suitable body of liquid such as kerosene, glycerine or like substance, and is provided with a buoyant float 29 having suitable compass indicia 31 on its periphery. The center of float 29 is recessed as at 30 to receive pivot 23 and is provided with a permanent or compass magnet (not shown) designed to cause rotation of float 29 around pivot 23 under the influence of the earth's magnetic fields. Due to the use of a body of liquid, float 29 is dampened in its movement so that excessive vibrations and shocks will not materially influence the action of the compass. Diaphragm 22, furthermore, permits expansion of the liquid upon increase of temperature without affecting the action of the compass.

The compass as thus far described illustrates a preferred form of compass capable of being used with the novel mounting and compensating mechanism of the present invention, which will now be described. To this end a bracket 35, having apertures 36 therein designed to receive suitable screws is provided for securing the bracket to a supporting structure. Bracket 35 has a protruding arm 37 terminating in a ball shaped member 38. Member 38 is received between a pair of spaced flat, bent metal arms 39 formed integrally with a split band 40 and shaped to provide a socket 41, in which member 38 is disposed to permit universal movement of arms 39 and band 40 with respect to bracket 35. Arms 39 are secured together at their upper and lower ends by machine screws 42 and 43 respectively. When screws 42 are loose arms 39 and band 40 are capable of universal movement around ball 38. However, upon tightening screw 42 arms 39 and band 40 are locked against movement around ball 38. As a consequence band 40 may be disposed in any desired relation with respect to bracket 35 for a purpose to be hereinafter pointed out.

Band 40 is designed to receive compass 10 in such a manner that bodily rotation of compass 10 in band 40 is readily permitted when screw 43 is loose. To so mount the compass, ring 14 is provided with an annular recess 44 of a width corresponding to the width of band 40 and a depth somewhat less than the thickness of band 40. Band 40, accordingly, protrudes from the peripheral surface of ring 14 and retains compass 10 against axial movement with respect to band 40.

As seen in Figure 2, the screw 43 at the lower end of arms 39 is in substantial alignment with the vertical center of band 40. Accordingly, when screw 43 is tightened, band 40 is radially contracted and tightly grips ring 14 and locks compass 10 against rotation in band 40.

A suitable lubber's mark, preferably in the form of a depending arrow head 45, is suitably located on band 40. Preferably it is formed as an integral part thereof. The mark extends below ring 14 and overlies the portion of glass bowl 12 through which the compass indicia are viewed, thus affording a suitable reference point from which the compass may be read. The lubber's mark is located on a plane, passing through the geometrical center of ball 38 and vertically through the lubber's mark, so that the plane mentioned may be readily located parallel to the line of travel of the vehicle when mounted in place on a suitable part of the vehicle body.

The compass of the present invention is mounted and adjusted in the following manner: Compass 10 is disposed in band 40 and screw 43 is tightened only sufficiently to retain compass 10 in band 40, while permitting bodily rotation of the compass 10 with respect to said band. Bracket 35 is then, preferably, mounted on a suitable transverse element of the vehicle body, such as the header above the windshield, by means of self-tapping screws or the like. It is, of course, clear however that bracket 35 may be secured in any suitable place by any desired means due to the novel universal connection between band 40 and bracket 35.

After bracket 35 is suitably secured in place, screw 42 is loosened and the compass and band 40 are revolved around ball 38 until the compass is substantially level in all directions and so that the plane through the center of ball 38 and the lubber's mark is parallel to the normal line of travel of the vehicle. Screw 42 is then tightened and the compass and band 40 are thus locked in place.

Since the vertical plane passing through the lubber's mark and the center of wall 38 is normal to the transversely extending portion of bracket 35, when the bracket is connected to a transverse body member, it is likewise parallel to the line of travel of the vehicle. When the compass is mounted so that it is parallel to said line it may be adjusted to give an accurate heading for the vehicle. Such adjustments are made as follows:

The vehicle with all doors closed is headed due west or due east, preferably the former, and bolt 18 is rotated in a clockwise or counter-clockwise direction, according to the direction of compass deviation from the known heading of the vehicle, until the compass reading correctly indicates the known direction. This compensation of compass 10 is accomplished in well known manner by adjustment of magnets 17 and will not be discussed in detail.

The vehicle is then headed due north or due south, preferably north, and the compass 10 is bodily rotated with respect to band 40 and lubber's marks 45, in a clockwise or counter-clockwise direction as may be necessary, until the compass reading is correct in this direction. Screw 43 is then tightened and compass 10 is locked against further bodily movement.

The vehicle is then headed in the first direction, west as described, and bolt 18 if necessary, is rotated as previously described until the compass reading is again correct on the west heading of the vehicle. The compass, after this last compensating adjustment is made, is compensated on the four principal compass points and is located in parallel relation to the line of travel of the vehicle.

It will, accordingly, be clear that an extremely simple yet accurate means is provided for mounting a magnetic compass in or on a vehicle in parallel relation to the vehicle's line of travel irrespective of the position in which the bracket is mounted, and that extremely simple operations will compensate the compass for deviations due to local magnetic fields and conditions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A magnetic compass, including a casing, direction indicating means rotatably mounted in said casing for movement under the influence of the earth's magnetic field, adjustable magnetic means in said casing compensating for local magnetic influences causing deviation of said means, a bracket for mounting said compass, and a ring bearing a lubber's mark mounted on said bracket and secured against azimuthal adjustment, said ring encircling said casing in a manner permitting gripping of the casing to rotatably shift it in said ring, whereby said casing may be readily bodily adjusted in effecting azimuthal adjustment of said compass.

2. The combination defined in claim 1 wherein said ring is split and means for selectively causing said ring to tightly grip said casing and retain it in adjusted relation with respect to the lubber's mark after compensation has been effected.

3. A magnetic compass comprising a casing having a transparent portion, direction indicating means buoyantly and rotatably supported in said transparent portion for movement under the influence of the earth's magnetic field, adjustable magnetic compensating means in said casing for eliminating local magnetic influences acting to cause a deviation of said means, an annulus for rotatably receiving said casing, a lubber's mark formed on said annulus for coaction with said direction indicating means, said casing extending outside of said annulus to permit grasping said casing to effect relative rotation of said casing with respect to said annulus and lubber's mark in adjusting said compass for azimuthal deviation.

4. The combination defined in claim 3 including a bracket adapted to mount said casing and said annulus on a supporting structure, and a universal connection between said bracket and said annulus permitting proper alignment of said compass and for leveling said compass.

5. A mounting and compensating mechanism for a magnetic compass comprising a bracket, a ball shaped member on said bracket, a ring for supporting said compass, a socket carried by said ring and receiving said ball member whereby said ring is connected to said bracket by a universal connection permitting proper levelling of said compass, and a lubber's mark on said ring, said compass being supported by and within said ring to permit bodily rotation of said compass with respect to said lubber's mark, whereby certain deviations of said compass readings due to local magnetic conditions may be readily corrected by turning the compass.

6. A magnetic compass, including a bracket carrying a ball, a split ring having spaced arms adjacent its free ends provided with sockets receiving said ball, compass-mechanism rotatively mounted in said ring, clamping means at the free ends of said arms for drawing said arms together to secure said ring from movement with respect to said ball, and separate clamping means at the ends of said arms adjacent the ends of said ring for contacting said ring to secure said compass mechanism from rotation in said ring.

7. A magnetic compass, comprising a bowl containing liquid, a magnet controlled buoyant float bearing direction indicia immersed in said liquid, a flexible imperforate diaphragm above said liquid, a pivot for said float carried by said diaphragm, and a casing having compensating mechanism therein, said diaphragm being clamped between said bowl and said casing whereby said liquid is sealed from said mechanism by said diaphragm.

8. A magnetic compass, comprising a casing, compensating mechanism mounted in a chamber in said casing, a bowl containing liquid depending from said casing, a flexible diaphragm clamped between said casing and said bowl and forming a wall separating the casing chamber from the bowl chamber and sealing said compensating mechanism in said casing chamber, a magnet controlled buoyant float in said bowl having direction indicia, and a pivot for said float depending from said diaphragm.

9. In a magnetic compass assembly, a bracket for said compass, an annulus for receiving said compass attached to said bracket and thereby not subject to azimuthal adjustment, a lubber's mark carried by said annulus, said annulus and said compass being associated so as to expose the indicia of said compass and so as to permit bodily rotation of said compass in said annulus with respect to said lubber's mark.

10. A magnetic compass, comprising a casing including an opaque portion and a transparent bowl, magnet-controlled direction •indicating means in said casing and visible through said bowl, compensating magnets adjustably mounted in said opaque portion of said casing, a ring bearing a lubber's mark thereon for coaction with said direction-indicating means, said ring extending circumferentially around the midportion of the casing only for supporting said casing for rotation about the axis of rotation of said indicating means and with respect to said lubber's mark, a bracket, and means to attach said ring to said bracket.

11. A magnetic compass, comprising a bracket, a ring bearing a lubber's mark, a casing rotatably mounted in said ring and extending above and below said ring to permit grasping said casing to effect azimuthal adjustment of said compass by rotating said casing within and with respect to said ring and said lubber's mark, direction indicating means and compensating magnets in said casing, a connection between said bracket and ring including a universal joint permitting proper levelling of said compass, mechanism to fix said ring with respect to said bracket and mechanism to fix said casing after azimuthal adjustment with respect to said ring.

MAXIMILIAN KLEIN.
BERNHARD WILLACH.